Nov. 7, 1967 K. W. MISEVICH ET AL 3,350,941
HUMIDITY SENSING ELEMENT
Filed May 20, 1965

INVENTORS.
HARRIS M. SULLIVAN
KENNETH W. MISEVICH
BY
Andrus & Starke
ATTORNEYS

United States Patent Office 3,350,941
Patented Nov. 7, 1967

3,350,941
HUMIDITY SENSING ELEMENT
Kenneth W. Misevich and Harris M. Sullivan, Milwaukee, Wis., assignors to Johnson Service Company, Milwaukee, Wis., a corporation of Wisconsin
Filed May 20, 1965, Ser. No. 457,371
16 Claims. (Cl. 73—336.5)

This invention relates to an improved capacitance humidity sensing element for use in humidity control and/or indication systems.

Humidity sensing elements of the electrical capacitance type are sensitive to changes in the moisture content of the air and respond in the form of a change in capacitance to variations in humidity. In the past, the humidity sensing elements of this type have not been pure capacitance elements but have included resistive components of electrical impedance which result in a dissipative effect capable of generating heat and giving erroneous readings.

The present invention is directed to an approximately pure capacitance humidity sensing element suitable for incorporation in an environmental control system and which provides a fast, precise indication of the relative humidity content of air over extreme ranges of humidity, temperature, pressure and other environmental variables. The humidity sensing element includes a moisture insensitive, nonmetallic core having a high electrical resistivity and a low dielectric constant. Thin layers or coatings of a dielectric, highly moisture sensitive material are located on opposite surfaces of the core and are capable of adsorbing water and reaching equilibrium in a period of less than two minutes.

A porous layer of an electrically conductive material, such as carbon black or the like, is applied to the outer surface of each of the moisture sensitive layers and the porous nature of the electrically conductive material permits water vapor to penetrate through the layer faster than it will diffuse into the moisture sensitive material. Suitable electrical conductors connect the electrically conductive layers in a circuit with an A.C. bridge or charge time components which measure the capacitance and convert this to an electrical signal which can be read on a meter or can be used to operate a humidity control system.

The function of the moisture sensitive outer layers is to increase the sensitivity of the element, particularly at low humidities. The capacitance is related to the partial water vapor pressure by virtue of the value of the dielectric constant of the moisture sensitive layers. Since water will have a higher dielectric constant than most dielectrics used as the moisture sensitive layer, the effective dielectric constant of the element will increase as the moisture content of the air increases; thus the capacitance will also increase in relation to the increase in relative moisture content of the air. At high humidity values, the core may also tend to absorb moisture which will change the dielectric constant of the core material to some degree, and this tends to increase the overall capacitance effect.

The humidity sensing element of the invention is an approximately pure capacitance element which significantly reduces the dissipative effect present in prior art types of capacitance humidity sensing elements. The element will give a fast and precise indication of humidity in the range of 5 to 95% relative humidity and the element will not be damaged by humidity extremes.

Other objects and advantages will appear in the course of the following description.

The drawings illustrate the best mode presently contemplated of carrying out the invention.

Figure 1:
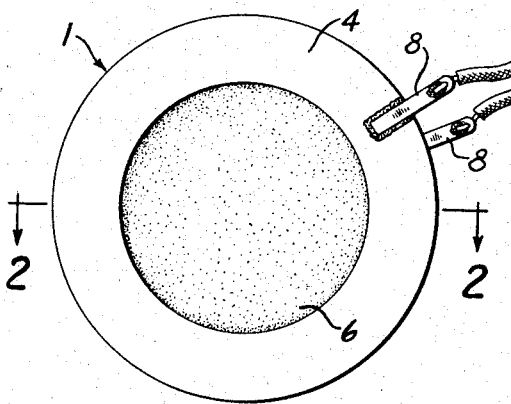
FIGURE 1 is a plan view of a humidity sensing element prepared in accordance with the invention.
Figure 2:
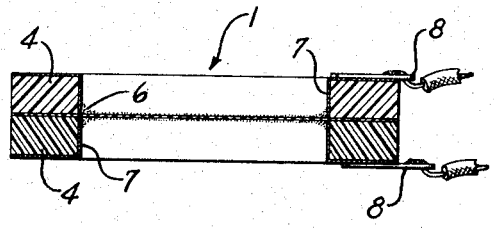
FIG. 2 is a section taken along line 2—2 of FIG. 1.
Figure 3:
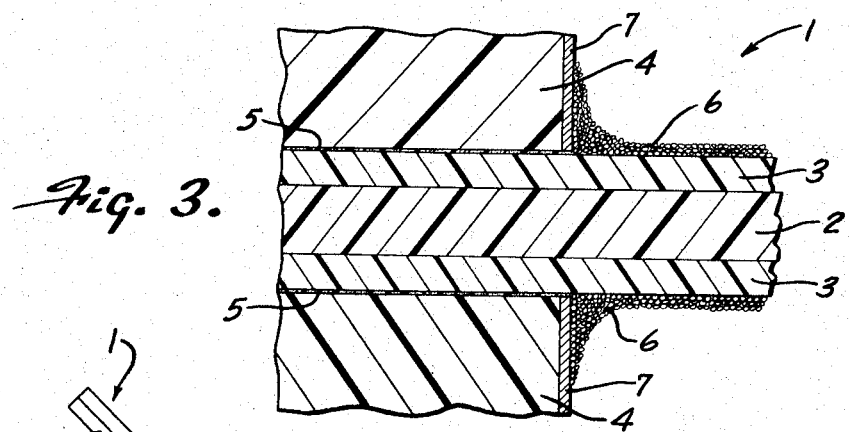
FIG. 3 is an enlarged fragmentary section showing the dielectric layers and the attachment of the frames to the layers.

FIGS. 1–3 illustrate a humidity sensing element 1 comprising a flat disc-like core 2, and layers 3 of a moisture sensitive, dielectric material are located on opposite surfaces of the core to provide an integral structure. The outer periphery or margin of the core 2 and layers 3 are secured between a pair of nonconducting frames 4 by a layer of adhesive 5. A porous coating of an electrically conductive material 6 is disposed over the outer surface of each of the layers 3 and is in electrical contact with an electrically conducting surface 7 on the frames. The frames 4 are formed of an electrically nonconducting material such as fiber reinforced resin, and the conductive coating 7 may be formed of any electrically conductive material such as silver paint or the like. Terminals 8 are soldered or otherwise attached to the conductive coating 7.

The core 2 is formed of a moisture insensitive, dielectric material having a high electrical resistivity above $1 \times 10^9$ ohm inches. In addition, the core has a relatively low dielectric constant, less than 10 and generally in the range of 2 to 6, and a low dissipation factor, less than 0.5. It is also desirable that the core be dimensionally stable such that it will have a dimensional increase of less than 2%, and preferably less than 1%, with a change from 0% to 100% relative humidity.

Organic polymers having a minimum number of polar groups such as hydroxyl, carboxyl, amino and imino can be used as the core material. Specific organic polymers which can be utilized as the core are cellulose esters in which the esterifying acids contain up to 8 carbon atoms and preferably up to 6 carbon atoms. The examples of esters are cellulose triacetate, cellulose acetate-butyrate, cellulose acetate-propionate, cellulose acetate-valerate, cellulose butyrate, cellulose succinate, cellulose phthalate, and the like. It is preferred that the cellulose be substantially 100% esterified so that a minimum number of hydroxyl groups remain in the molecule; thus cellulose triacetate is preferred over cellulose monoacetate or cellulose diacetate.

Other organic films which can be used as the core are polycarbonate films; copolymers of vinylene carbonate and vinyl acetate having approximately 30 mol percent vinylene carbonate; linear acetal polymer films of unbranched polyoxymethylene averaging 1000 or more in molecular weight such as Delrin (E. I. du Pont de Nemours & Co.); oriented polyester films such as Mylar (E. I. du Pont de Nemours & Co.) and Kodar (Eastman Kodak Company); oriented polyolefin film, such as polyethylene or polypropylene; and the like.

The outer surface layers 3 are formed of a dielectric material which has a high sensitivity to moisture. The material of layer 3, having a thickness of 0.001 inch or less, should be capable of adsorbing at least 5%, based on its dry weight, of moisture when exposed to 95% relative humidity at 70° F. for a period of one half hour. The dry weight is to be measured at less than 5% relative humidity and at 70° F. The moisture sensitivity of layers 3 is greater than that of the core 2 and the material of layers 3 is capable of adsorbing an appreciably greater amount of moisture than the core under the same conditions.

The dry material of layers 3 should have a dielectric constant less than 10 and generally in the range of 2 to 8, at less than 5% relative humidity, and the material at a relative humidity of 80% should have a dielectric constant at least double the dielectric constant of the dry material. As the total effective dielectric constant of the capacitor is determined at least in part by the thickness of the moisture sensitive layer, the above limits are applicable to a layer having a thickness in the range of .00005 inch to less than half of the final total thickness of the capacitor dielectric.

Generally speaking, the layers 3 are formed of a material characterized by having molecular chains with long bulky repeat units, inhibited rotation of the chain segments and polar groups such as hydroxyl, carboxyl, imino or amino. These characteristics result in repeatable dimensional changes, and high diffusional transport rates for water. Specific examples of moisture sensitive materials which can be used as the layers 3 are cellulose; hydroxyl ethyl cellulose; carboxyl methyl cellulose; cellulose derivatives such as cellulose ethers; gelatin; polyvinyl alcohol; polyacrylamide; polyacrylic acid; keratin; collagen; starch and starch derivatives; regenerated proteins such as casein and zein; synthetic material such as polyvinyl pyrrolidone, and modified nylon; and the like.

The thickness of the core 2 has a definite relation to the thickness of the layers 3. Each layer 3 should be at least 5% of the overall thickness of the composite structure and each layer 3 should preferably be between 10 to 40% of the thickness of the composite structure depending on the sensitivity required in the element.

The core 2 and layers 3 are bonded together throughout their extent and various methods may be employed to provide the bond between the members. For example, the layers 3 can be developed by chemical treatment of the surface of the core. Alternately, the layers 3 can be applied by coating the core with a solvent solution of the moisture sensitive material and subsequently evaporating the solvent. As a third method, the moisture sensitive layers 3 can be bonded to the core by use of auxiliary adhesives or can be applied to the core by fushion.

It is preferred that the layers 3 and the core 2 have coefficients of thermal expansion which are similar because differences in the coefficient of thermal expansion between the core 2 and the layers 3 may produce interfacial stresses. Normally, it is desirable to keep the coefficient of thermal expansion as low as possible to avoid any temperature effect on the performance of the element and in most cases the coefficient of thermal expansion will be in the range of $1 \times 10^{-5}$ to $10 \times 10^{-5}$.

It has been found that a cellulose ester core having its outer surface hydrolyzed to regenerated cellulose, provides an excellent humidity sensing element. The cellulose ester core can be subjected to the influence of either an alkaline or an acid medium to hydrolyze substantially all of the acid radicals in the surface layer to thereby obtain a regenerated cellulose film which provides a maximum moisture sensitivity. The hydrolyzation can be accomplished by dipping the cellulose ester core into the alkali or acid bath and maintaining it in the bath for a period of time sufficient to hydrolyze the acid groups on the surface of the core. Alkaline materials which can be employed for the hydrolyzation are aqueous or alcoholic solutions of alkali metal bases, such as sodium hydroxide, potassium hydroxide or lithium hydroxide. Alternately, alcoholic solutions of strong organic bases, such as tetramethyl guanidine, trimethyl amine, benzyltrimethyl ammonium hydroxide can be used for the hydrolyzation.

Hot alkaline solutions are preferred to increase the reaction rate. The time of contact or immersion in the alkaline solution depends, of course, on the materials used, the temperature and strength of the solution. For example, a two-hour hydrolysis period using a 5% sodium hydroxide solution was required to hydrolyze a mixed cellulose ester core to produce a satisfactory element. By increasing the strength of the solution to 50%, an almost immediate hydrolyzation occurred. The most effective reaction conditions were found to be obtained by immersing the core material in a 230° F. 40% sodium hydroxide solution for one to four minutes depending on desired layer thicknesses.

After the hydrolyzation, the element is preferably rinsed in water to remove and dilute the alkaline residue.

Solutions of mineral acids, such as hydrochloric acid and sulphuric acid, can also be used to hydrolyze the cellulose ester. However, the use of alkaline material provides a faster hydrolyzation and is preferred.

The hydrolyzation treatment can also be employed to provide a moisture sensitive outer layer on the core consisting of a copolymer of vinylene carbonate and vinyl acetate. The unhydrolyzed copolymer is a tough dimensionally stable film with little sensitivity to moisture. By hydrolyzing the outer surface of the copolymer with an alkaline material, as described above, a film or layer 3 is produced which is sensitive to relative humidity.

In place of the chemical treatment of the core material, the moisture sensitive outer surfaces can be cast from solvent solutions. In this case, the solution of the moisture sensitive material is cast or applied to the surface of the core material in the form of a thin film. The composite material is then dried to evaporate the solvent. The resulting product has a moisture sensitive surface firmly bonded to the moisture insensitive core material.

The electrical conductive layers 6 are formed of an electrically conductive material and are permeable to permit water vapor to penetrate through the layers and contact the moisture sensitive layers 3. The layer 6 may be in the form of finely divided particles of dust, or a porous spray-deposited layer, or the like. Any electrically conductive material can be used as the layer 5 such as carbon, zinc, aluminum and the like. It has been found that carbon black or other carbon particles blown on the outer surface of the layers 3 provides a uniform, electrically conductive layer 6 which is permeable to the passage of water vapor.

If electrically conductive particles, such as carbon dust, are employed as the conductive layer 6, the particles are blown onto the layers 3 and adhere to the layers without auxiliary adhesives. It is necessary that there be close physical contact between the electrically conductive particles and the layers 3, but it is preferred not to employ an auxiliary bonding agent to bond the particles to the moisture sensitive layers as the auxiliary bonding agent may tend to seal the surface and prevent moisture from contacting the layers 3. The outer surfaces of layers 3 can be made more receptive to the electrically conductive particles of coating 6 by initially roughening or blasting the surfaces with an abrasive slurry to provide a frosted-type surface.

Moreover, it has been found that the adherence of the conductive particles to the layers 3 can be enhanced by spraying an atomized solvent for the material of layers 3 on the outer surface of the layers to which the conductive particles 6 had previously been applied. The solvent will tend to dissolve a thin film of the layer 3 causing the particles 6 to sink into the film, and on evaporation of the solvent the particles will be firmly held in the solidified layers 3.

In addition to the use of metallic particles the coating 6 can be applied to the layers 3 by metal spraying, vaporizing or vacuum evaporation which provides a thin, porous coat.

To take full advantage of the capacitance effect, the electrically conductive coating 6 should be applied over the entire surface area of the moisture sensitive layers 3.

The humidity sensing element of the invention is an approximately pure capacitance element which will normally provide a .1% to 2% capacitance change with a 1% change in relative humidity at temperatures in the range of 40° F. to 200° F. The capacitance change can be varied by variation in the materials, and it is possible to design a unit having a smaller capacitance change than the range indicated above. In this case the smaller change can be amplified to provide the desired electrical signal.

The humidity sensing element can be connected in any

Figure 4:
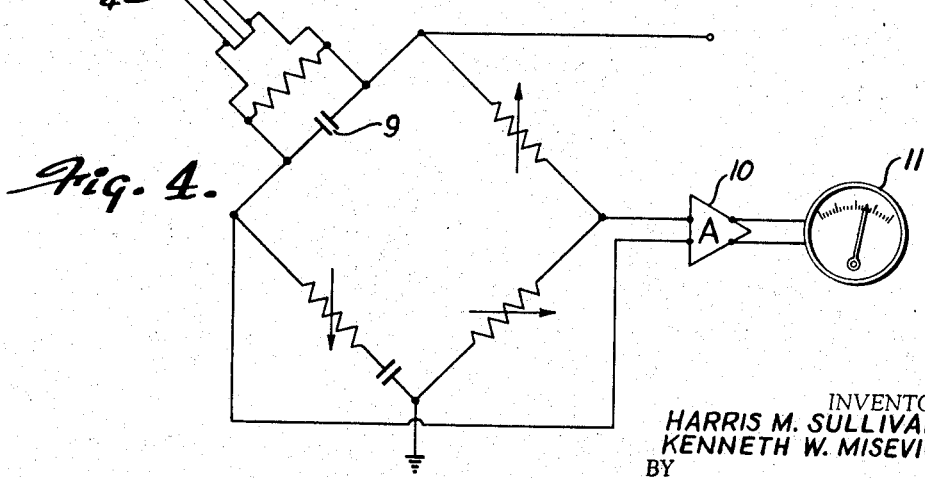
FIG. 4 is an electric circuit showing a typical manner in which the element can be connected in a humidity indication system.

A.C. or bridge circuit or charge time circuit which will measure capacitance and convert this to an electrical signal which can then be read on an indicator or be used to actuate a humidity control system. As shown in FIG. 4 the humidity sensing element 1 is connected across a capacitor 9 in a leg of a modified Wien bridge and the output of the bridge is connected through an amplifier 10 to a meter 11 which is calibrated to indicate the relative humidity.

The capacitance value of the element 1 is much smaller than the capacitance value of capacitor 6 so that the output of the bridge will be approximately linear with capacitance changes in element 1.

In place of the humidity indicating device 11, the voltage from amplifier 10 can be sent into a receiver-controller which will give a signal to an operator for a humidity control system.

The following example illustrates the preparation of the humidity sensing element.

A 12% film casting solution was made by adding 18 grams of cellulose acetate-butyrate powder to 132 grams of acetone, sealing the container to avoid solvent evaporation, and mixing on a mill. Mixing usually is continued for 10 minutes after all solids are taken into solution. The solution was then allowed to stand about ½ hour to complete air separation before casting films. Film casting was performed on a 12" x 18" No. 18 plate-glass plate using a 6-mil Bird applicator. After casting, the film was dried for 10 minutes before stripping. The resulting film thickness was .007 inch after evaporation of the acetone.

A 2" x 6" sample of the cellulose acetate-butyrate film was immersed in 1000 ml. of a 40% by weight sodium hydroxide solution in distilled water at a temperature of 230° F. Complete immersion in the solution was assured by weighting the end of the sample with stainless steel clips. The reaction time was four minutes. Following a rinse with tap water, the sample was air dried at 70° F. and 50% relative humidity under the tension provided by the weighting clips. The resulting film thickness of the laminar system was .00065 inch. The loss in thickness of .00005 inch resulted from removal of side chain acetyl and butyral groups due to the hydrolysis. Each hydrolyzed outer layer had a thickness of about .0001 inch.

An aqueous dispension of an abrasive (6 micron $SiO_2$) was blown at a pressure of 30 p.s.i. against the outer surface of each of the hydrolyzed layers to provide a frosted or roughened effect.

The resulting element was then bonded by an adhesive between a pair of glass fiber reinforced resin frames and carbon black, having approximately a 17 millimicron particle size, was then dusted on the outer surface of each hydrolyzed layer with an air brush.

Eighteen such elements were prepared and the average capacitance of the eighteen elements at 5% relative humidity and 83° F. was 1.33 millimicrofarads. Increasing the relative humidity to 95% provided an approximately linear increase in capacitance at the rate of 0.0123 millimicrofarad/1% RH.

The elements had a 90% response time of one minute in changing from 10% to 60% relative humidity at 85° F. and at an air flow rate of 30 feet per minute.

Various modes of carrying out the invention are contemplated as being within the scope of the following claims particularly pointing out and distinctly claiming the subject matter which is regarded as the invention.

We claim:

1. An approximately pure capacitance synthetic humidity sensing element, comprising a thin sheet-like dielectric core formed of a substance substantially insensitive to moisture and having a dielectric constant in the range of 2 to 6, a layer of a moisture sensitive material bonded to opposite surfaces of the core, said material having a high sensitivity to moisture and being capable of adsorbing at least 5%, based on its dry weight, of moisture when exposed to 95% relative humidity at 70° F. for a period of 30 minutes, and a porous coating of an electrically conductive material applied to the outer surface of each of the moisture sensitive layers, said coating being porous to the diffusion of water vapor therethrough to permit water vapor to contact the moisture sensitive layers.

2. The structure of claim 1 in which the electrically conductive material comprises carbon black.

3. The structure of claim 1 in which both the core and the moisture sensitive layers have a coefficient of thermal expansion in the range of $1 \times 10^{-5}$ to $10 \times 10^{-5}$.

4. A capacitance synthetic humidity sensing element, comprising a thin sheet-like dielectric core formed of a substance substantially insensitive to moisture and having a dielectric constant of less than 10, a layer of a moisture sensitive material bonded to opposite surfaces of the core, said material being capable of adsorbing at least 5%, base on its dry weight, of moisture when exposed to 95% relative humidity at 70° F. for a period of 30 minutes and being capable of adsorbing greater quantities of moisture than the core under the same humidity conditions, a porous coating of an electrically conductive material applied to the outer surface of each of the moisture sensitive layers, said coating being porous to the diffusion of water vapor therethrough to permit water vapor to contact the moisture sensitive layers, and means for connecting said coatings of electrically conductive material in an electrical circuit.

5. A capacitance, synthetic, humidity sensing element, comprising a thin, sheet-like core having a high electrical resistivity and a dielectric constant in the range of 2 to 6, a layer of moisture sensitive dielectric material applied to opposite surfaces of the core, said moisture sensitive material being characterized by the ability to adsorb at least 10% by weight of water when saturated and each of said moisture sensitive layers comprising at least 5% of the overall thickness of the core and said layers; and a coating of interconnected finely divided metallic particles applied to the outer surface of each moisture sensitive layer, said coating being porous to the diffusion of water vapor.

6. A synthetic, approximately pure capacitance, humidity sensing element, comprising a dielectric moisture insensitive core having an electrical resistivity greater than $1 \times 10^9$ ohm-inches and a dielectric constant of less than 10 and a dissipation factor less than 0.5, a layer of a moisture sensitive material bonded to opposite surfaces of the core, the dry moisture sensitive material having a dielectric constant of less than 10 at a relative humidity of less than 5% and said material when saturated at a relative humidity of 80% having a dielectric constant at least double the dielectric constant of the dry material, a porous layer of electrically conductive material applied to the outer surface of each of the moisture sensitive layers, said last named layers being sufficently porous to permit water vapor to penetrate therethrough and contact the moisture sensitive layers, and means for connecting the coatings of the electrically conductive material in an electrical circuit.

7. The element of claim 6 in which the electrically conductive coating is in direct physical contact with the moisture sensitive layer and the interface between the coating and the moisture sensitive layer is free of bonding materials.

8. The element of claim 6 in which the core is dimensionally stable such that it will have a dimensional increase of less than two percent with a change from 0% to 100% relative humidity.

9. The element of claim 6 in which the element has a 0.1% to 2% capacitance change with a 1% change in relative humidity at temperatures in the range of 40° F. to 200°F.

10. A synthetic capacitance humidity sensing element, comprising a thin, sheet-like strip of cellulose ester in which the esterifying acids contain up to 8 carbon atoms and said ester is substantially free of hydroxyl groups, a layer of cellulose applied to opposite faces of the strip, said cellulose being highly sensitive to moisture conditions and being capable of adsorbing substantial quantities of water to change the dielectric constant thereof, and a coating of an electrically conductive material applied to the outer surface of each cellulose layer, said coating being porous to permit water vapor to pass therethrough and contact the cellulose layers.

11. The structure of claim 10, and including connecting means for connecting the coatings of electrically conductive material in an electrical circuit.

12. An approximately pure capacitance synthetic humidity sensing element, comprising a thin sheet-like dielectric core formed of a substance substantially insensitive to moisture and having a dielectric constant in the range of 2 to 6, a layer of a moisture sensitive material bonded to opposite surfaces of the core, said material having a high sensitivity to moisture and being capable of adsorbing at least 5%, based on its dry weight, of moisture when exposed to 95% relative humidity at 70° F. for a period of 30 minutes, an electrically insulating frame secured to the outer surface of said layers, each frame having a central opening to expose the respective layer through the opening, an electrically conductive coating disposed on the outer surface of the frames, and a porous coating of an electrically conductive material disposed on the outer surface of the portion of each moisture sensitive layer exposed within the openings and disposed in electrical conductive relation with said first named coating, said last named coating permitting water vapor to pass therethrough and contact the moisture sensitive layers.

13. A capacitance, synthetic, humidity sensing element, comprising a dielectric structure, separate coatings of an electrically conductive material applied to opposite portions of said dielectric structure, said dielectric structure comprising a first section and a second moisture sensitive section disposed in contact with a first of said coatings of said electrically conductive material, said first coating being porous to permit water vapor to penetrate therethrough and contact said second section, said first section having a high electrical resistivity and a low dielectric constant and a low dissipation factor, and said second section being characterized by the ability to absorb substantial quantities of water and capable of absorbing greater quantities of water than the first section under the same humidity conditions.

14. The element of claim 13 wherein said first section has resistivity greater than $1 \times 10^9$ ohm-inches and a dielectric constant less than 10 and a dissipation factor less than 0.5, and said second section has a dielectric constant less than 10.

15. A capacitance humidity sensing element, comprising a dielectric structure, a first layer of an electrically conductive material applied to a surface of said dielectric structure, a second layer of an electrically conductive material applied to a second surface of the dielectric structure and spaced from the first layer, said dielectric structure comprising a core and a layer of a moisture sensitive material bonded to at least one surface of the core and disposed in contact with said first layer of said electrically conductive material, said core having a resistivity greater than $1 \times 10^9$ ohm-inches and a dissipation factor less than 0.5, and said moisture sensitive layer formed of a substance having a dielectric constant in the range of 2 to 6 at less than 5% relative humidity and said substance when in equilibrium at a relativity of 80% having a dielectric constant at least twice the dielectric constant of the dry substance, said layers of electrically conductive material being porous to permit water vapor to penetrate therethrough and contact the moisture sensitive layer.

16. A synthetic laminated humidity sensing element, comprising a dielectric structure, and separate coatings of electrically conductive material applied to opposite portions of said dielectric structure, said dielectric structure comprising a first section formed of a cellulose ester in which the esterifying acid contains up to 8 carbon atoms and a second section of cellulose bonded to the first section and disposed in contact with one of said coatings of electrically conductive material, said coating of electrically conductive material being sufficiently porous to permit water vapor to penetrate therethrough and contact said second section.

References Cited
UNITED STATES PATENTS

| | | | |
|---|---|---|---|
| 2,884,593 | 4/1959 | Miyata | 73—336.5 X |
| 3,083,573 | 4/1963 | Shaw | 73—336.5 |
| 3,192,426 | 6/1965 | Feuer | 324—71 X |

FOREIGN PATENTS 450,410  8/1948  Canada.

LOUIS R. PRINCE, *Primary Examiner.*

J. NOLTON, *Assistant Examiner.*